(12) United States Patent
Maziers et al.

(10) Patent No.: US 8,658,070 B2
(45) Date of Patent: Feb. 25, 2014

(54) PROCESS FOR PREPARING MULTILAYER ROTOMOULDED ARTICLES

(75) Inventors: Eric Maziers, Seneffe (BE); Gaetano Donizetti, Nembro (IT)

(73) Assignees: Total Petrochemicals Research Feluy, Seneffe (Feluy) (BE); Persico S.p.A., Nembro (BG) (IT)

( * ) Notice: Subject to any disclaimer, the term of this patent is extended or adjusted under 35 U.S.C. 154(b) by 252 days.

(21) Appl. No.: 12/740,851

(22) PCT Filed: Nov. 4, 2008

(86) PCT No.: PCT/EP2008/064948
§ 371 (c)(1), (2), (4) Date: Sep. 24, 2010

(87) PCT Pub. No.: WO2009/059974
PCT Pub. Date: May 14, 2009

(65) Prior Publication Data
US 2011/0017749 A1   Jan. 27, 2011

(30) Foreign Application Priority Data

Nov. 7, 2007 (EP) .................................. 07120135

(51) Int. Cl.
*B29C 41/04* (2006.01)

(52) U.S. Cl.
USPC .................. 264/255; 264/297.8; 264/310

(58) Field of Classification Search
None
See application file for complete search history.

(56) References Cited

U.S. PATENT DOCUMENTS 5,169,549 A * 12/1992 Weber ............................. 249/80
2007/0063370 A1 * 3/2007 Steinberger et al. .......... 264/109

FOREIGN PATENT DOCUMENTS

FR            2128241        * 10/1972

* cited by examiner

*Primary Examiner* — Edmund H. Lee

(57) ABSTRACT

This invention relates to the field of multilayer articles prepared by rotational molding with a robotized rotomolding machine wherein the mold is under direct heating.

15 Claims, 9 Drawing Sheets

PROCESS FOR PREPARING MULTILAYER ROTOMOULDED ARTICLES

CROSS-REFERENCE TO RELATED APPLICATIONS

This application claims the benefit of PCT/EP2008/064948, filed Nov. 4, 2008, which claims priority from EP 07120135.4, filed Nov. 7, 2007.

This invention relates to the field of multilayer articles prepared by rotational moulding with a robotised rotomoulding machine wherein the mould is directly heated by ducts carrying hot fluid.

Polyethylene represents more than 90% of the polymers used in the rotomoulding market. This is due to the outstanding resistance of polyethylene to thermal degradation during processing, to its easy grinding, its good flowability, and its low temperature impact properties.

Rotomoulding is used for the manufacture of simple to complex, hollow plastic products. It can be used to mould a variety of materials such as polyethylene, polypropylene, polycarbonate polyamide, polyethylene terephthalate (PET), ethylene/vinyl alcohol copolymers (EVOH) or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications, where transparency is desired, from their whiteness in natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerisation of these polymer alloys requires a complex catalyst system comprising organometallic catalyst precursors, cationic forming cocatalysts and cross-linking agents.

It is desired to produce articles prepared with two or more layers of similar or dissimilar material in order to improve the final properties of the finished product. For example, it may be desirable to combine the good barrier and temperature stability of polyamide with the acceptable food contact and qualities of polyethylene, such as for example low cost and good impact at low temperature. It is known however that polyamide does not adhere to polyethylene and a bonding layer or cross-linking is therefore necessary in order to insure structural integrity.

There is thus a need to produce rotomoulded multilayer articles that do not suffer from these drawbacks.

It is an aim of the present invention to prepare rotomoulded articles having good adherence between layers of dissimilar material.

It is another aim of the present invention to prepare rotomoulded articles having good permeation resistance, and/or chemical resistance.

It is a further aim of the present invention to prepare rotomoulded articles having a good thermal stability at elevated temperatures.

It is yet a further aim of the present invention to prepare rotomoulded articles wherein any one of the layers, preferably the barrier layer, is very thin.

It is also an aim of the present invention to prepare rotomoulded articles wherein all layers have a controlled and even thickness.

It is yet another aim of the present invention to prepare rotomoulded articles with a short cycle time.

Any one of these aims is, at least partially, fulfilled by the present invention.

Accordingly, the present invention discloses the use of a robotised rotomoulded machine as described in European patent application no 07005758.3, in order to prepare rotomoulded articles having at least two layers and comprising:
  a. a layer A that is a polyethylene (PE)-based layer prepared from a composition comprising:
     from 40 to 99 wt % of polyethylene (PE) resin and
     from 60 to 1 wt % of a functionalised polyolefin (FPO) or of an ionomer or of a polyolefin (PO) grafted to a non-polyolefin (NPO) in the form of a block copolymer (PO)g-NPO), or of a mixture thereof;
  b. a layer B comprising:
     from 40 to 100 wt % of a PO that is dissimilar from that of layer A or of a NPO or of a mixture thereof;
     from 0 to 60 wt % of a FPO or of a (PO-g-NPO), or of a mixture thereof;
  c. optionally a layer C prepared from a polymer that is similar to or dissimilar from that of layer A or layer B and is adjacent to layer A and/or layer B and, if present, is characterised in that it has good adhesion to layer A and/or to layer B and is not a blend of layer A and layer B wherein any one layer can have a thickness of less than 1 mm and an even thickness distribution, and wherein the mould includes ducts designed to be run through by heat-regulating fluid, said ducts being realised by grooves on the external surfaces of the mould.

In another embodiment according to the present invention, the heat-regulating fluid is contained in pipes that are included in the mould.

Any one layer, but preferably layer B preferably has a thickness of less than 1 mm, preferably of less than 0.7 mm and can be as thin as or thinner than 0.5 mm. At the same time it is characterised by a very even thickness distribution, even in parts of the article having a very complex structure. This is particularly important in the field of fuel tanks wherein layer B is the barrier layer.

In a preferred embodiment according to the present invention, adhesion between layer A and layer B is developed by the functional or grafted polyolefin or ionomer present in either layer, preferably in layer A.

The functionalised polyolefins, if present are polyolefins grafted with a material that provides polarity and/or reactivity and they therefore depend upon the nature of the adjacent layers. Preferably in the present invention, the polyolefins are grafted with anhydride and preferably, the polyolefin is polyethylene or polypropylene, more preferably, it is polyethylene. Alternatively, the functionalised polyolefin is an ionomer. Grafted polyethylene provides excellent adhesion properties whereas ionomers enhance mechanical properties. In a more preferred embodiment according to the present invention, the functionalised polyolefin is a mixture of ionomer and grafted polyethylene.

When using FPO, the NPO has reactive species for creating the bond. When using PO-g-NPO, the PO is compatible with the NPO section. For example, the PO-g-NPO can be a polyolefin-g-polyamide.

The outer layer which may be layer A or layer B comprises homopolymers or copolymers of ethylene, and/or polyamide, and/or PET, and/or ethylene/vinyl alcohol copolymers (EVOH), and/or functional fluoropolymer, and optionally a functionalised polyolefin. In this description, copolymers are prepared from one monomer and one or more comonomers.

Preferably, the composition of layer A comprises polyethylene prepared with a metallocene-based catalyst system. It can be a blend of polyethylenes.

In a preferred embodiment according to the present invention, the composition of layer A comprises from 70 to 98 wt % and more preferably from 80 to 95 wt % of polyethylene, and preferably from 30 to 2 wt % and more preferably from 20 to 5 wt % of functionalised polyolefin or ionomer or combination thereof.

In a more preferred embodiment according to the present invention, the article has two layers wherein the external layer is a composition consisting of polyethylene and a functionalised polyolefin and the internal layer comprises polyamide (PA) or ethylene/vinyl alcohol copolymer (EVOH), or polyvinylidene fluoride (PVDF), or polyethylene terephthalate (PET), or fluoropolymers containing functional groups. Preferably layer B is prepared from PA or EVOH.

When layer B is prepared from polyamide, layer A is preferably prepared from a polyethylene composition.

When layer B is prepared from EVOH, it is included between layer A and layer C that are preferably both prepared from the same polyethylene composition.

The main advantage of the present rotomoulding machine, fully described in patent application no EP07005758.3 is its capability of easily achieving any heat regulation path, even on complex surfaces, while also insuring a constant distance of the latter from the internal surface of the mold. It is also characterised by a homogeneous heat conduction and thus an excellent heat exchange between the heat-regulating fluid and the metal of the mould. In addition, the heating system is exactly adapted to each mould and is not a standard oven used for moulds of all shapes and sizes. Homogeneous heating and cooling of the mould is obtained, as shown in FIG. 1, through rotating joints 14 that allow passage of the fluid between two parts of the frame in reciprocal movement. Heating or cooling fluid feeding unit 15 sends the appropriate fluid to mould 13 to condition its temperature in accordance with predetermined requirements. The fluid can be for example oil, steam or water with or without glycol.

As may be seen diagrammatically in FIG. 2, the mould is realised with fluid ducts 30 incorporated directly in the mass of its walls. This can be obtained by means of co-founding piping or compatible material in the mould. Aluminium is the preferred material.

Any technique known in the art can be adopted, such as for example 'metal spray', appropriately treated resins, welding, drilling or milling. Alternatively it is very advantageous to prepare the mould by means of machining with material removal for example with numerically controlled machines as shown in FIG. 3.

FIG. 3 shows diagrammatically mould 10 for rotary moulding prepared in accordance with European patent application 07005758.3. Mould 10 includes a mould body 11. The interior reproduces the desired shape. On the external surface, there are grooves 16, forming channels that are open on the top. Advantageously the grooves are formed laterally by ribs 12, appropriately separated, and projecting from the external surface of the mould to form the side surfaces of the channels.

The channel grooves or ribs can be obtained by mechanical removal of material or directly when melting the mould body. This can also be done to conform to the technique of realisation of the metal mould shell: the side walls of the heat-regulation system can be conveniently realised by mechanical processing from a metallic block or by melting. The preferred metal is aluminium.

Each channel is closed in segments by metallic strips welded between the ribs. Advantageously the strips include straight sheet metal bands 13 in the straight sections, that are cut from a ribbon and possibly bent, and from curves of sheet metal handlebar 14, advantageously cut from a metal sheet, welded over the pairs of ribs which realise the channel sides. The channels end in unions 17 for connection of known means (not shown) for circulation of the heat-regulation fluids, both for heating and for cooling. The material of the bands and curves of suitable thickness can be the same as that of the ribs. The unions between one strip segment and the other can also be obtained advantageously by welding.

The use of ducts positioned directly in the mass of the mould gives good thermal conduction with contact. In addition, it is possible to distribute the thermal heat exchange on the different parts of the mould in the most appropriate manner, increasing or decreasing the tubing distribution density on the mould, and adopting tubing of ideal thickness and material, and selecting an appropriate pitch between one piping and the other. The problem of hydraulic seal of the circulation circuit is also completely avoided.

To guarantee an homogeneous heating and cooling of the mould it is advantageous that the circulation tubing have the fluid access and outlet holes positioned at a few centimeters apart and that the fluid delivery and return sections be arranged in alternating positions so as to compensate on the mould surface for the progressive cooling of the fluid during baking and progressive heating during the solidification step as a consequence of the thermal exchange with the mould.

The arrangement of the tubing in alternating order between the delivery and return sections of the heating and cooling fluids of the mould achieves the purpose of balancing the temperature gap between the delivery and returning fluid.

In particular, for tubing realised with a material different from that of the mould, it is preferred to adopt a non-rectilinear path on the mould wall and to create curves that allow compensation of the different expansion coefficients of the metals during the heating and cooling steps.

The same piping can be used for both heating and cooling of the mould.

The use of the ducts incorporated in the mould and therefore in close contact with the mould allows considerable reduction of the volumes of fluid in circulation within said ducts. It is thus possible to limit the time for replacement of the heated fluid with the refrigerated fluid and vice versa or make the thermal exchanges faster thereby speeding up the moulding cycle.

The present machine is also designed to operate simultaneously with several moulds of different shapes and sizes, each having its own heating system. The various resins for each mould are dropped in appropriate feeders and the system automatically fills each mould with the appropriate resin at the appropriate time in the cycle. At the end of the cycle, all rotomoulded articles are automatically demoulded and stored.

The present invention also discloses a process to prepare two-layer articles in a robotised rotomoulding machine that comprises the steps of:

a) providing a polyethylene composition comprising from 40 to 99 wt % of polyethylene and from 60 to 1 wt % of functionalised polyethylene;
b) providing a polyamide (PA) or an ethylene/vinyl alcohol copolymer (EVOH);
c) optionally providing a second polyethylene composition comprising from 40 to 99 wt % of polyethylene and from 60 to 1 wt % of functionalised polyethylene, said composition being the same as or different from that of layer a);
d) feeding each resin in a separate feeder of the rotomoulding machine;
e) installing the one or more moulds of the same or different shapes and sizes;
f) starting the automatic rotomoulding cycle;
g) automatically demoulding and retrieving the rotomoulded articles.

The resins for layers A, B and optional C can be used in three different forms:
pellets having a diameter of from 2 to 4 mm;
micro-pellets having a diameter of from 200 to 1500 microns;
powder having a diameter of from 50 to 1500 microns. Preferably the ratio DPE/DPA of the particle diameters is of at most 0.5.

Preferably, the resin compositions are in powder form or in micro-pellet form or combination thereof. For small rotomoulded articles, micro-pellets are most preferred.

The preferred polyethylene according to the present invention is a homo- or co-polymer of ethylene produced with a catalyst comprising a metallocene on a silica/aluminoxane support. More preferably, the metallocene component is ethylene-bis-tetrahydroindenyl zirconium dichloride or dimethylsilylene-bis(2-methyl-4-phenyl-indenyl) zirconium dichloride. The most preferred metallocene component is ethylene-bis-tetrahydroindenyl zirconium dichloride.

In this description, the term copolymer refers to the polymerisation product of one monomer and one or more comonomers.

The melt index of the polyethylene resin used in the present invention are typically larger than 0.05 dg/min, preferably larger than 0.1 dg/min, more preferably larger than 0.2 dg/min, most preferably larger than 0.5 dg/min. The melt index is typically of at most 25 dg/min, preferably of at most 20 dg/min and most preferably of at most 16 dg/min. The melt flow index MI2 is measured following the method of standard test ASTM D 1283 at a temperature of 190° C. and a load of 2.16 kg. Typically the resin has a density of at least 0.910 g/cc, more preferably of at least 0.915 g/cc. It is of at most 0.975 g/cc, preferably of at most 0.965 g/cc and more preferably of at most 0.955 g/cc. The density is measured at a temperature of 23° C. following the method of standard test ASTM D 1505.

The polyethylene of the present invention may also have a bi- or multimodal molecular weight distributions, i.e. they may be a blend of two or more polyolefins with different molecular weight distributions, which can be blended either physically or chemically, i.e. produced sequentially in two or more reactors.

The polydispersity D of the polyethylene suitable for the present invention is in the range 2 to 20, preferably 2 to 10, more preferably less than or equal to 6, and most preferably less than or equal to 4, the latter range being typically associated with the preferred metallocene-prepared polyethylene resins. The polydispersity index D is defined as the ratio Mw/Mn of the weight average molecular weight Mw over the number average molecular weight Mn.

The polyamides that can be used in the present invention are the products of condensation:
of one or more amino acids such as aminocaproic acid, 7-aminoheptanoic acid, 11-aminoundecanoic acid and 12-aminododecanoic acid of one or more lactams such as caprolactam, oenantholactam and lauryllactam;
of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

As examples of polyamides, mention may be made of PA 6 and PA 6-6, PA-7 or PA-11.

It is also advantageously possible to use copolyamides. Mention may be made of the copolyamides resulting from the condensation of at least two α,ω-aminocarboxylic acids or of two lactams or of one lactam and one α,ω-aminocarboxylic acid. Mention may also be made of the copolyamides resulting from the condensation of at least one α,ω-aminocarboxylic acid (or a lactam), at least one diamine and at least one dicarboxylic acid.

Advantageously, the copolyamide is chosen from PA 6/12 and PA 6/6-6.

Mixtures of polyamide and polyolefins can also be used as layer B. The polyamide is as disclosed hereabove. The polyolefin can be a functionalised or a non-functionalised polyolefin or can be a mixture of at least one functionalised and/or of at least one non-functionalised polyolefin.

A non-functionalised polyolefin is conventionally a homopolymer or copolymer of α-olefins or of diolefins such as, for example, ethylene, propylene, 1-butene, 1-octene or butadiene.

A functionalised polyolefin is a polyolefin grafted or copolymerised with a material that provides polarity and/or reactivity and it therefore depends upon the nature of the adjacent layers. It can be an α-olefin polymer containing reactive units (functionalities); such reactive units are acid, anhydride or epoxy functions. By way of example, mention may be made of the above polyolefins grafted or co- or terpolymerised with unsaturated epoxides such as glycidyl (meth)acrylate, or with carboxylic acids or the corresponding salts or esters such as (meth)acrylic acid or alternatively with anhydrides of carboxylic acids such as maleic anhydride.

More generally, amine terminated materials can also be used in layer B and they are preferably selected from polyamide diamine (PAdiNH$_2$). According to their process of manufacture and/or the chain limiter used, the polyamides may have excesses of acid or amine end groups or may even have a proportion of alkyl or other end groups, for example aryl or any other function, deriving from the structure of the limiter chosen. The excess of acid end groups derives from a diacid chain limiter. The excess of amine end groups derives from a diamine chain limiter. A primary amine chain limiter leads to a polyamide chain having an alkyl end and an amine end.

The name diamine polyamide, PAdiNH$_2$, refers to a polyamide which satisfies the following criteria:
it has a certain amount of chains ending on both sides with an amine group (NH$_2$)
the amount of chains ending on both sides with an amine group (NH$_2$) is greater than that of diacid chains (if any)
the concentration of amine groups is greater overall than the concentration of acid groups
a PAdiNH$_2$ is obtained by adding a diamine as chain limiter or, in the case of polyamides based on diamine and on diacid such as, for example, PA6-6, by adding more diamine comonomer than diacid comonomer.

The polyamides that can be used in layer B may also be impact-modified polyamides. Supple modifiers may be made, for example, of functionalised polyolefins, grafted aliphatic polyesters, optionally grafted copolymers containing polyether blocks and polyamide blocks, and copolymers of ethylene and of an alkyl (meth)acrylate and/or of a saturated vinylcarboxylic acid ester. The modifier may also be a polyolefin chain with polyamide grafts or polyamide oligomers thus having affinities with the polyolefins and the polyamides. The supple modifier may also be a block copolymer.

Foamed polyethylene may be used for layer A and/or foamed polyamide may be used for layer B.

Layer B may further advantageously be prepared from polyurethane or from a composition comprising polyamide and ethylene/vinyl alcohol copolymers (EVOH), and more generally, from a composition comprising polyamide or EVOH and optionally another barrier layer.

EVOH is a crystalline polymer that has a molecular structure represented by the following formula:

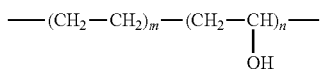

It resists oils and chemical agents and is thus suitable for packaging organic solvents, agricultural pesticides and all kinds of oils while keeping all the advantages of plastics. The advantage of the excellent gas barrier properties implies that small quantities of EVOH can be used without any loss of performance and protection capacity. Plastic fuel tanks including EVOH are safe, light in weight and have a highly effective barrier against fuel vapour permeation, ensuring that they meet the most stringent international emission standards. The fuel barrier of EVOH is about 4,400 times stronger than that of high-density polyethylene.

In a preferred embodiment according to the present invention, the second layer is prepared from polyamide. Polyamide is known to provide barrier properties and the addition of a polyamide layer thus provides improved barrier properties to the structure. Depending upon the final application, the polyamide layer can be used as an inside layer to provide for example permeation resistance, or as an outside layer, with for example an inner layer allowing for food contact.

In another preferred embodiment according to the present invention, layer B is prepared from EVOH. EVOH gives excellent barrier properties but it is fragile. The rotomoulded article thus preferably consists of three layers: a polyethylene composition layer/an EVOH layer/a polyethylene composition layer. Preferably, both polyethylen compositions are the same.

A polyamide (PA) layer also provides temperature stability at elevated temperatures of up to 115° C. For comparison, rotomoulded articles conventionally prepared with polyethylene exhibit temperature stability up to temperatures of at most 60° C.

A PA layer further provides good environmental stress crack resistance (ESCR).

Other layers may be added either by repeating the present invention as many times as necessary and/or by using bonding layers where necessary.

The thickness of each layer is determined by the size of the final product, by the desired properties and by the cost. In all the prior art rotomoulded articles, the thickness of any one layer is of at least 1 mm. Accordingly, the permeability requirements for fuel tanks are specified for layers having a thickness of at least 1 mm. The use of the new robotised rotomoulded machine described in European patent applications nos 07000013.8, 07005758.3 and Italian patent application MI2007000510 allows to reduce the thickness of any one layer to less than 1 mm. Thickness of as little as or smaller than 0.5 mm are easily obtained with an even thickness distribution. This can be seen in FIGS. 4 and 5 relative to the present invention that show an even thickness distribution for the thin polyamide layer. This must be compared with FIGS. 6 and 7 relative to equivalent rotomoulded articles prepared with the prior art equipment. On these figures, it can be seen that the thin polyamide layer is very uneven and absent in some portions of the walls. The excellent thickness distribution of the present invention is preserved, even in parts having a very complex structure such as multi-layer rotomoulded parts comprising inserts, as shown in FIG. 8. This must be compared with FIG. 9 representing an equivalent part prepared with a conventional rotomoulding machine.

The articles may contain additional layers for which the adherence is provided by conventional methods such as for example by a bonding layer.

The combination of the specific resin compositions and of the robotised rotomoulding machine is particularly advantageous as it allows a much better control of the rotomoulding temperature throughout the cycle than in classical oven-based rotomoulding machines. This precise temperature control of the robotised machine allows a very even thickness distribution of the 2 or more layers whereas the resin compositions of the 2 or more layers allows an optimal adhesion between the layers. The final products thus have excellent thickness distribution even in complex structures, as well as excellent adhesion between the layers. In addition, as the thickness distribution is more even, wall thickness can be reduced while keeping the same performance. This allows the preparation of rotomoulded articles having excellent quality with much less material. When conventional techniques are used the rejected articles amount to 10 to 30% of the production. In the present invention, the amount of unsatisfactory articles is of less than 3% of the production.

The method according to the present invention also allows a substantial reduction in cycle time of at least 25% as can be seen from FIG. 10: the larger the part, the larger the reduction in cycle time. This reduction in cycle time results from the combined effects of the selection of a metallocene-produced polyethylene resin and the selection of the rotomoulding machine with direct mould-heating device.

The present invention is useful for preparing barrier containers and particularly useful for preparing fuel tanks for motorcycles, cars and lorries with a size ranging from 1 L to 600 L and more generally for preparing complex structures.

LIST OF FIGURES

EXAMPLES

Several two-skinned rotomoulded bottles were prepared as follows:

The inner layer was a blend prepared by compounding 94 wt % of a metallocene-produced polyethylene resin sold by Total petrochemicals under the commercial name mPE MI3670, having a melt flow index MI2 of 4 dg/min, and a density of 0.940 $g/cm^3$, with 6 wt % of functionalised polyolefin consisting of 5 parts by weight of grafted polyethylene and 1 part by weight of ionomer and sold by Solvay under the name PRIEX®.

The outer layer was a polyamide sold by Arkema under the name RILSAN® PA-11 RDG231.

The bottles had a capacity of 7 liters and a total wall thickness of about 4 mm. The polyamide layer was of about 0.5 mm and the polyethylene layer of about 3.5 mm.

Figure 1:
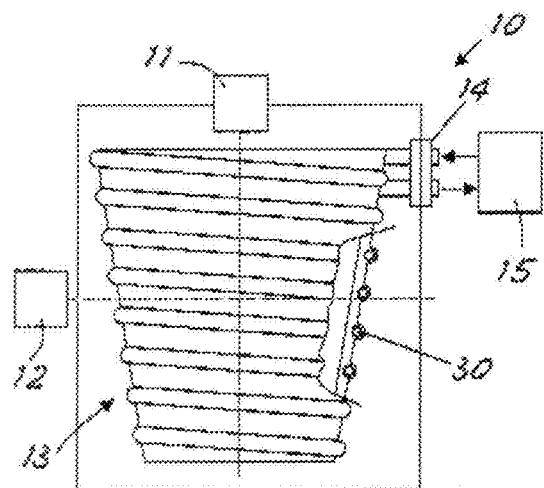
FIG. 1 represents diagrammatically the heating and cooling system of the mould showing how the fluid is circulating between two parts of the frame in reciprocal movement.
Figure 2:
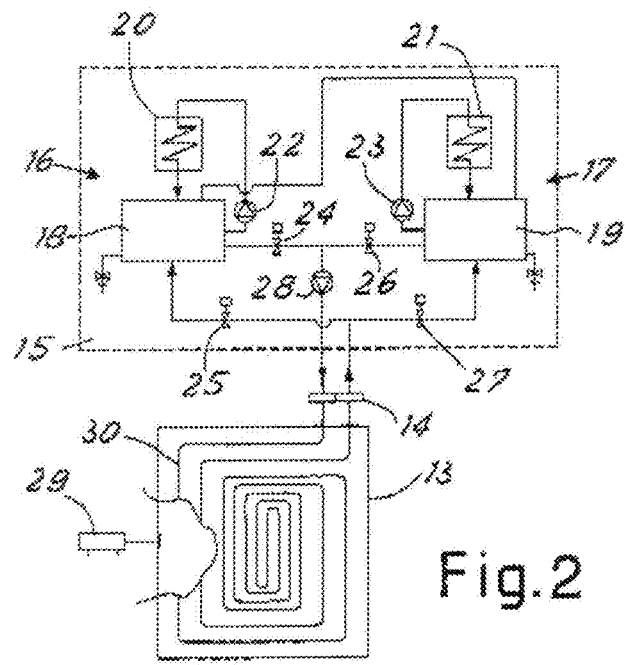
FIG. 2 represents diagrammatically the mould realised with fluid ducts incorporated directly in the mass of its walls.
Figure 3:
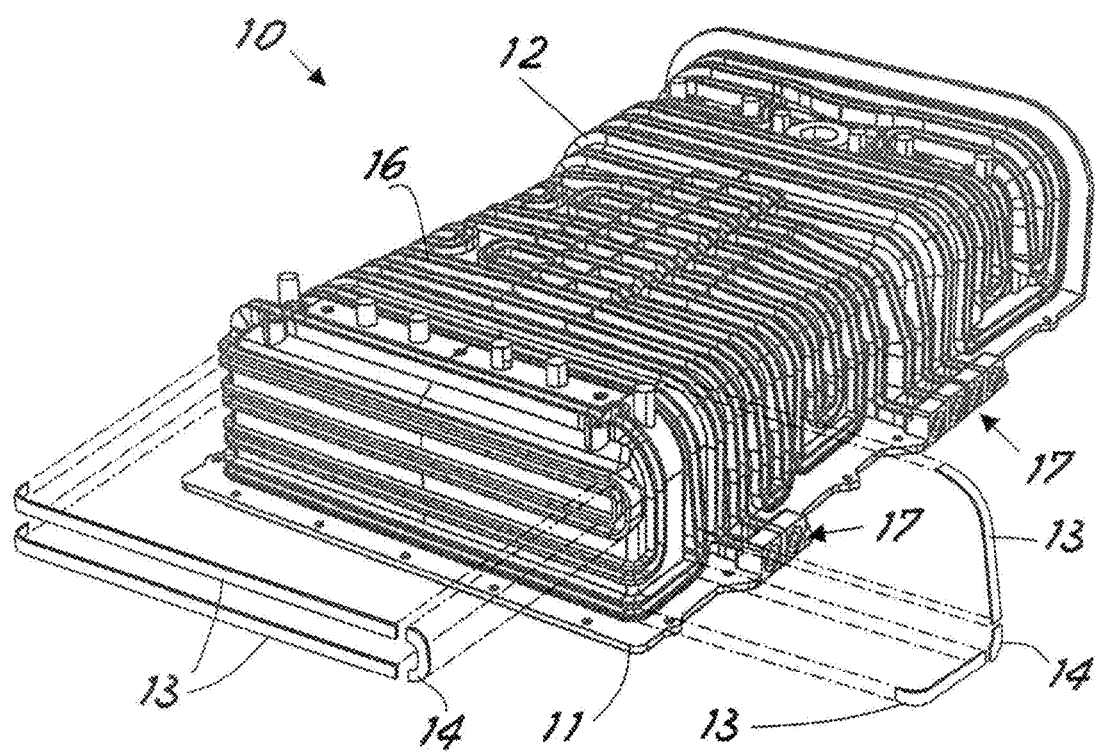
FIG. 3 shows diagrammatically mould 10 for rotary moulding prepared in accordance with European patent application 07005758.3, wherein the tubing on the mould is produced by material removal.
Figure 4:
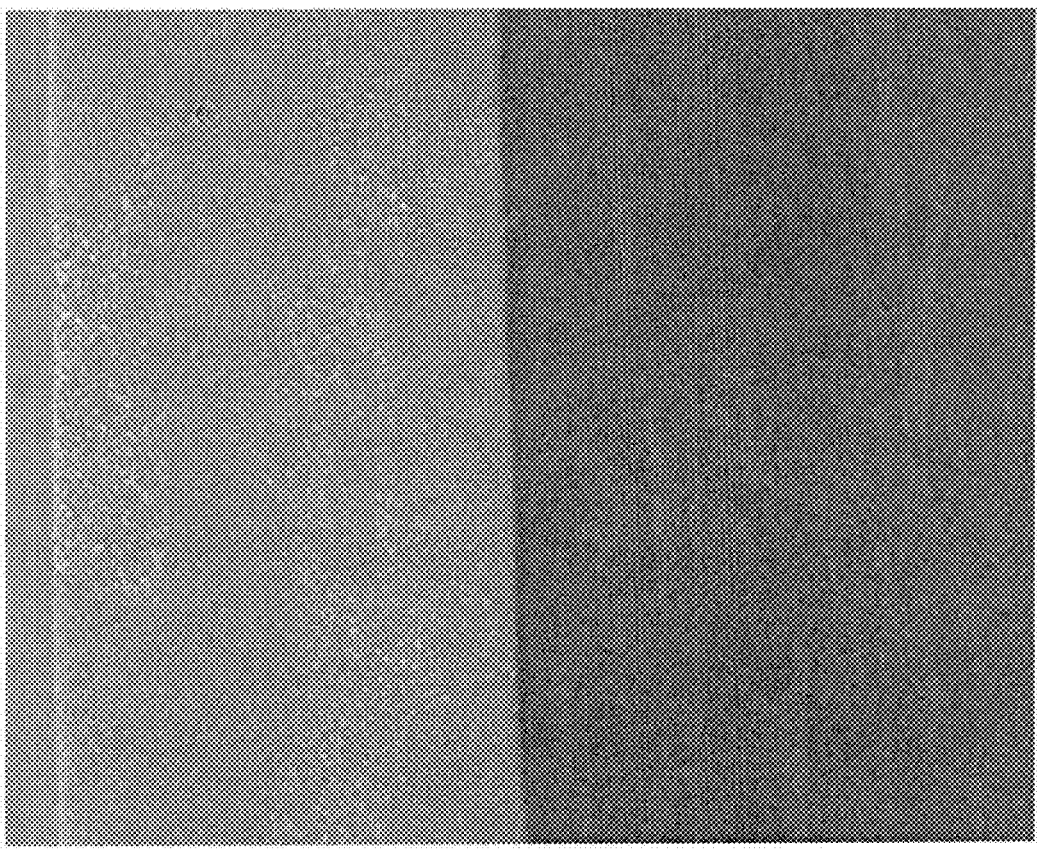
FIG. 4 represents a cross-section of a bi-layer rotomoulded article prepared according to the present invention, wherein one layer is prepared from polyethylene and the other layer is prepared from polyamide. It shows a smooth interface between the two layers.
Figure 5:
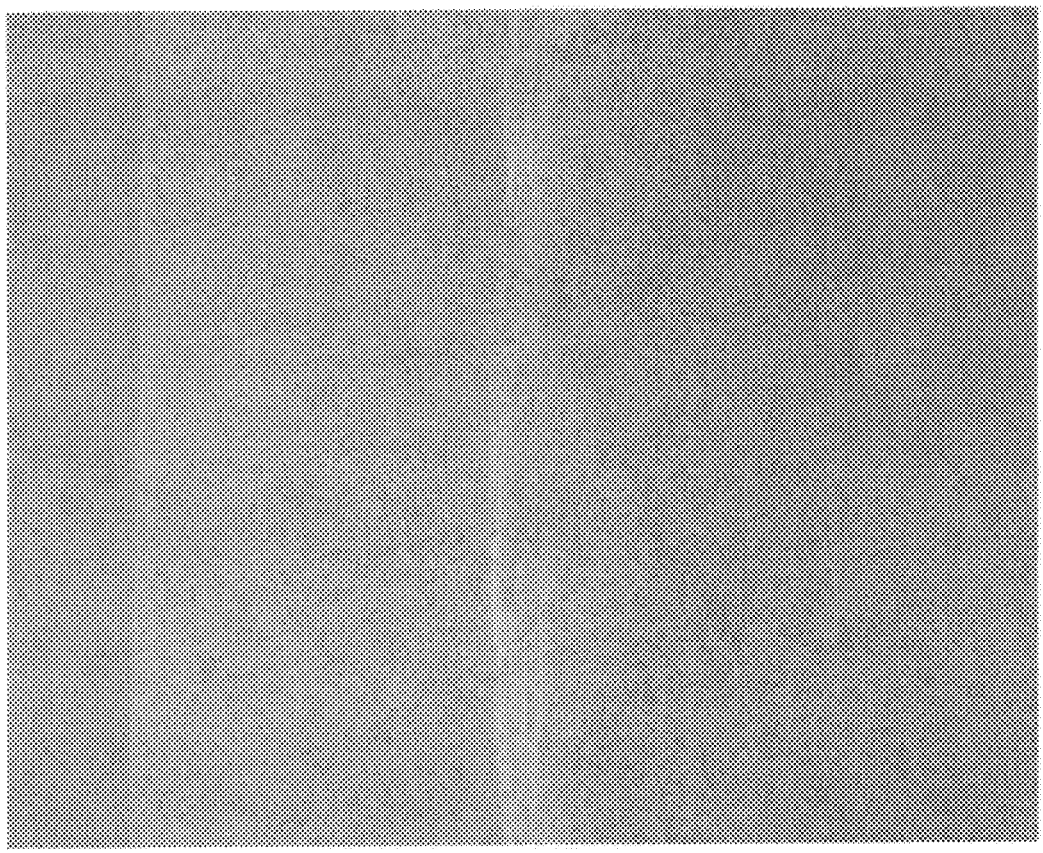
FIG. 5 represents another cross-section of the same rotomoulded article as that of FIG. 4.
Figure 6:
FIG. 6 represents a cross-section of a bi-layer rotomoulded article prepared with a conventional rotomoulding equipment, wherein one layer is prepared from polyethylene and the other layer is prepared from polyamide. It shows a very irregular interface between the two layers.

The bottles were prepared respectively according to the present invention as displayed in FIGS. 1 and 2 and with the prior art equipment as displayed in FIGS. 3 and 4.

Figure 7:
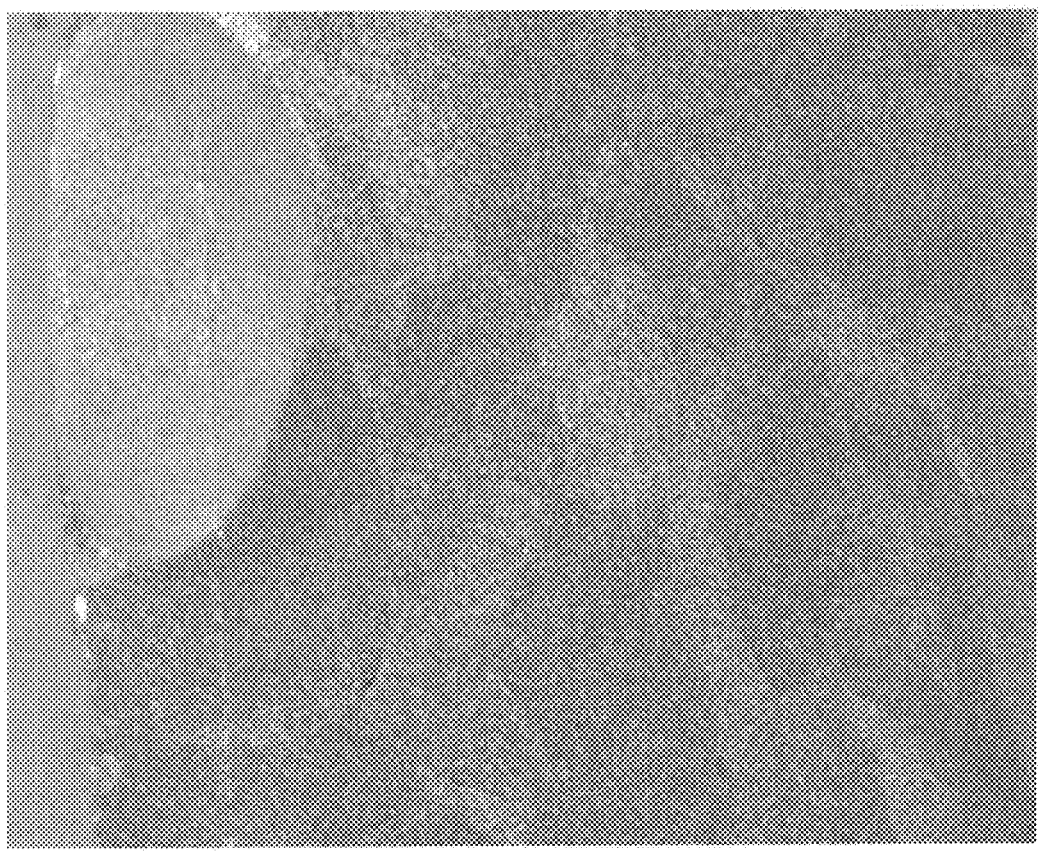
FIG. 7 represents another cross-section of the same rotomoulded article as that of FIG. 6.
Figure 8:
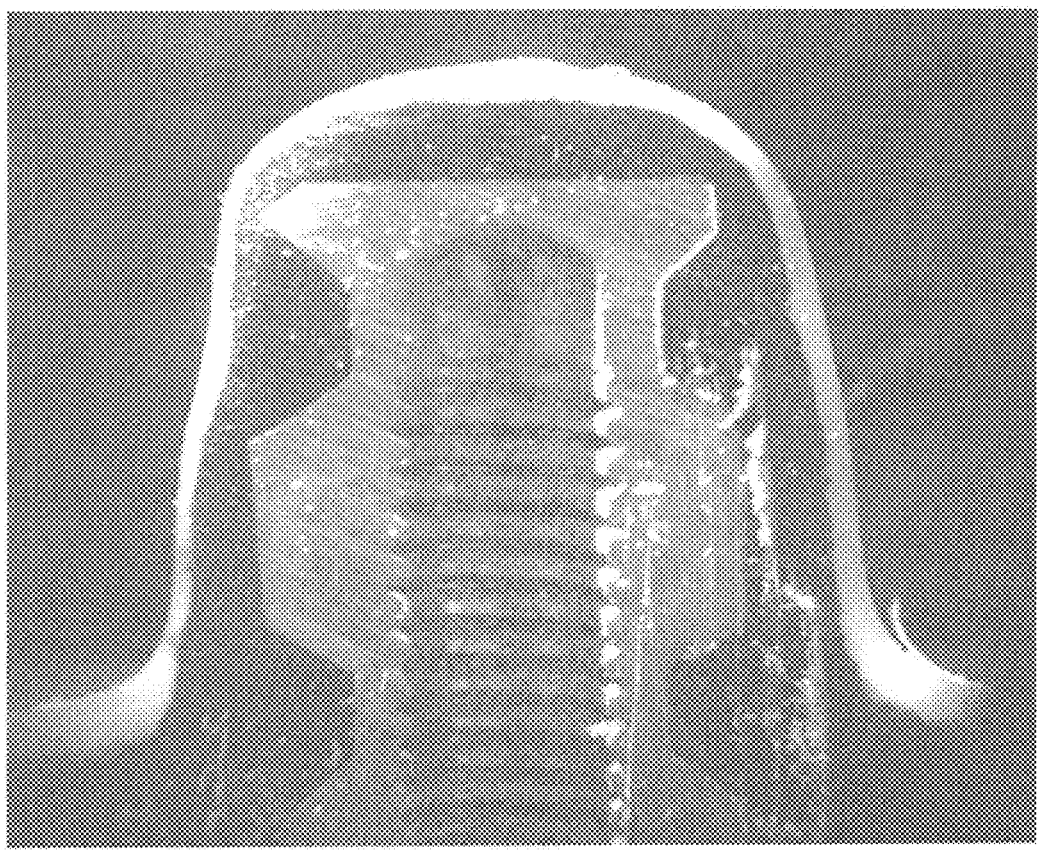
FIG. 8 represents a bi-layer rotomoulded part comprising an insert and prepared according to the present invention. The internal layer is polyethylene and the external layer is polyamide.
Figure 9:
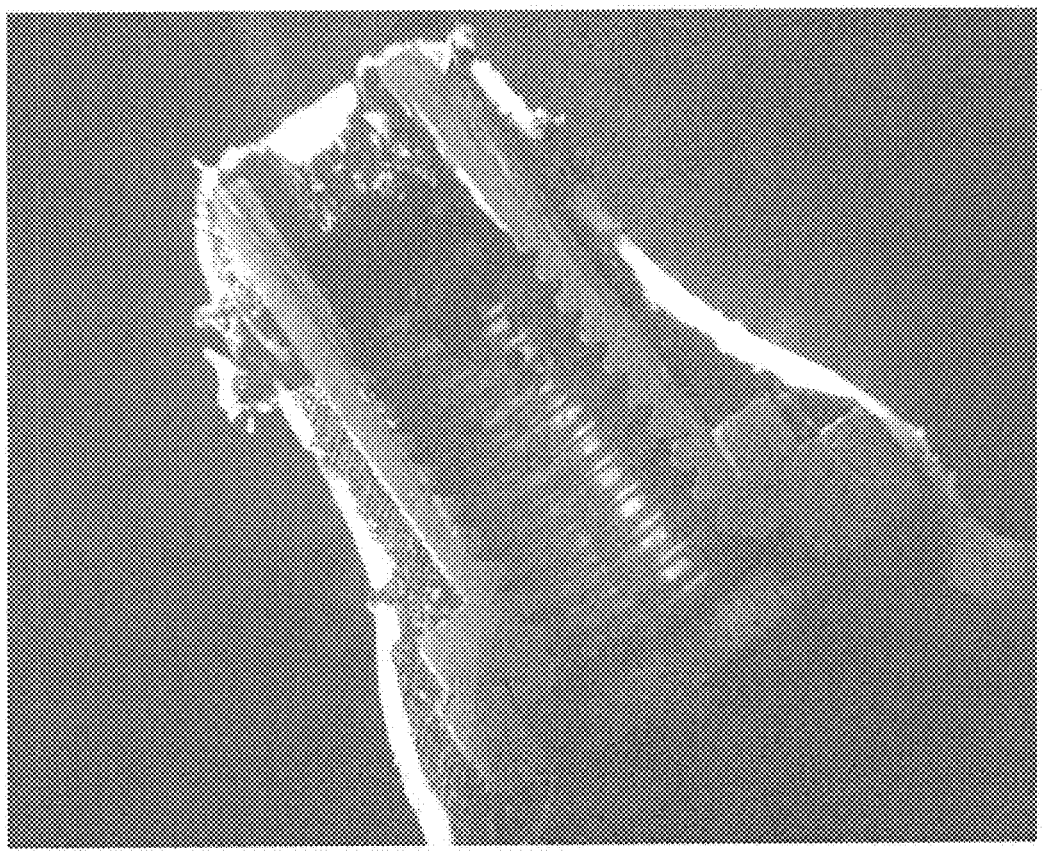
FIG. 9 represents a bi-layer rotomoulded part comprising an insert and prepared with a conventional rotomoulding equipment. The internal layer is polyethylene and the external layer is polyamide.
Figure 10:
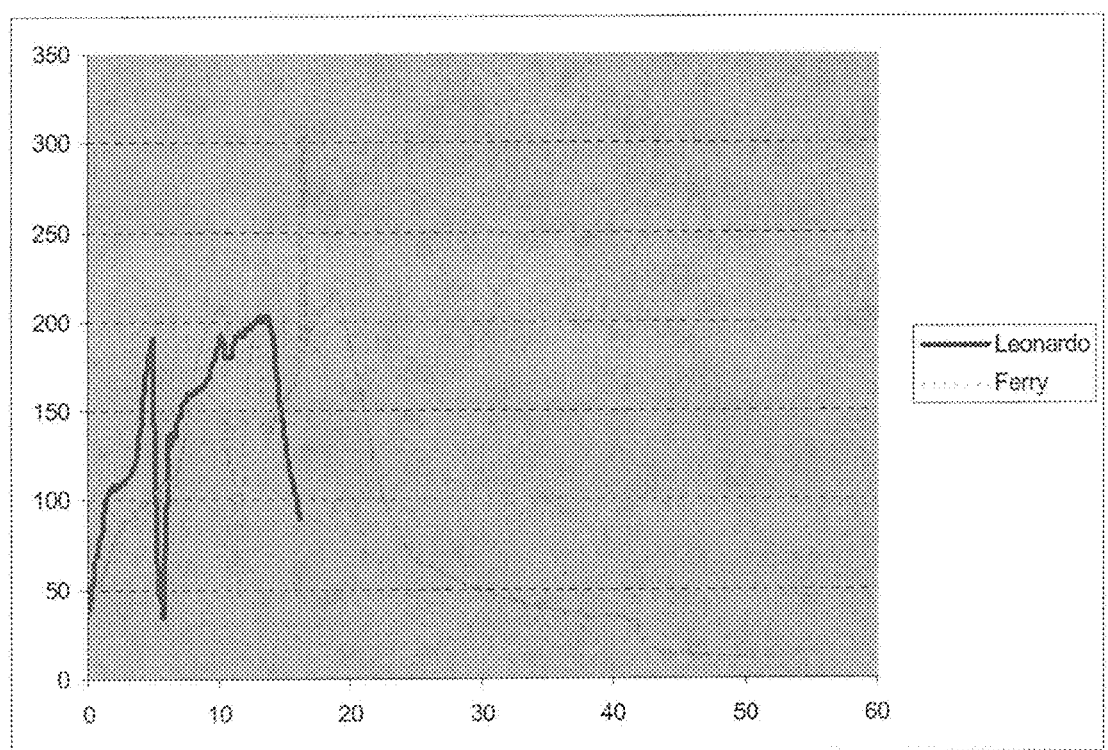
FIG. 10 represents the cycle time expressed in minutes for preparing a two-skinned 7 L rotomoulded article respectively according to the present invention and with conventional rotomoulding equipment.

FIG. 7 shows the cycle times for preparing the bottles according to the present invention (Leonardo) and with the prior art equipment (Ferry). It can be seen that the total cycle time is reduced from 25 minutes for conventional rotomoulding to 15 minutes for the present invention.

Larger bottles were also tested showing an even larger reduction in cycle time.

The invention claimed is:

1. A process for preparing rotomoulded articles having at least two layers in a robotised rotomoulding machine comprising several separate feeders and several moulds, each mould including ducts designed to be run through by heat-regulating fluid and said ducts being realised by grooves on the external surfaces of the mould, wherein the ducts are closed above and along their extension by metallic strips, said process comprising:

providing a first polyethylene composition for layer A comprising from 40 to 99 wt. % of a polyethylene (PE) resin and from 60 to 1 wt % of a functionalised polyolefin (FPO) or of an ionomer or of a polyolefin (PO) grafted to a non-polyolefin (NPO) in the form of a block copolymer (PO)g-NPO) or of a mixture thereof;

providing a barrier layer B prepared from 40 to 100 wt. % of a PO that is dissimilar from that of layer A or a NPO or a mixture thereof and from 0 to 60 wt. % of a FPO or a (PO-g-NPO) or of a mixture thereof;

optionally providing a second polyethylene composition for layer C prepared from a polymer that is similar to or dissimilar from that of layer A or layer B and is adjacent to layer A and/or layer B and, if present, is characterised in that it has good adhesion to layer A and/or to layer B and is not a blend of layer A and layer B;

feeding each resin in a separate feeder of the robotised rotomoulding machine;

installing one or more moulds of the same or different shapes and sizes;

starting the automatic rotomoulding cycle; and automatically demoulding and retrieving the rotomoulded articles.

2. The process of claim 1, wherein layer A is a blend of from 70 to 98 wt. % of the polyethylene resin that is a metallocene-prepared polyethylene and from 30 to 2 wt. % of the functionalised polyolefin.

3. The process of claim 1, wherein the functionalised polyolefin is a mixture of grafted polyethylene and ionomer.

4. The process of claim 1, wherein layer B is polyamide or EVOH.

5. The process of claim 1, wherein layer C, if present, comprises from 40 to 99 wt. % of polyethylene and from 60 to 1 wt. % of functionalised polyethylene said composition being the same as or different from that of layer A.

6. The process of claim 1, wherein the resins are in powder form or in micro-pellets form.

7. The process of claim 1, wherein the cycle time is reduced by at least 25% when compared to a conventional cycle time.

8. The process of claim 1, wherein barrier layer B is prepared from polyamide and layer C is absent and characterised in that the barrier layer has a thickness of less than 0.5 mm said layer having an even thickness distribution.

9. The process of claim 1, wherein barrier layer B is prepared from EVOH and layer C is present, is the same as layer A and is not adjacent to layer A and characterised in that the barrier layer has a thickness of less than 0.5 mm said layer having an even thickness distribution.

10. The process of claim 1, wherein the polyethylene resin has a polydispersity ranging from 2 to 20.

11. The process of claim 1, wherein the polyethylene resin has a polydispersity ranging from 2 to 10.

12. The process of claim 1, wherein the polyethylene resin has a polydispersity that is less than or equal to 6.

13. The process of claim 1, wherein the polyethylene resin has a polydispersity that is less than or equal to 4.

14. The process of claim 1, wherein at least one of layer A and layer B has a thickness of less than 0.5 mm and an even thickness distribution.

15. The process of claim 1, wherein the metallic strips are welded to the external surfaces of the mould.

* * * * *